US011275801B1

(12) United States Patent
McCracken, Jr. et al.

(10) Patent No.: US 11,275,801 B1
(45) Date of Patent: Mar. 15, 2022

(54) PERFORMANCE METRICS COLLECTION AND PROMULGATION FROM WITHIN A MOBILE APPLICATION

(71) Applicant: T-Mobile Innovations LLC, Overland Park, KS (US)

(72) Inventors: Billy G. McCracken, Jr., Olathe, KS (US); Lyle W. Paczkowski, Mission Hills, KS (US); Robert L. Spanel, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 480 days.

(21) Appl. No.: 16/292,794

(22) Filed: Mar. 5, 2019

(51) Int. Cl.
| | |
|---|---|
| G06F 16/953 | (2019.01) |
| H04L 67/04 | (2022.01) |
| H04L 67/53 | (2022.01) |
| H04L 9/06 | (2006.01) |
| G06F 16/23 | (2019.01) |
| H04L 67/52 | (2022.01) |
| G06T 1/20 | (2006.01) |
| H04L 67/02 | (2022.01) |
| H04L 67/01 | (2022.01) |
| H04L 51/046 | (2022.01) |

(52) U.S. Cl.
CPC ........ G06F 16/953 (2019.01); G06F 16/2379 (2019.01); H04L 9/0637 (2013.01); H04L 67/04 (2013.01); H04L 67/18 (2013.01); H04L 67/20 (2013.01); G06T 1/20 (2013.01); H04L 51/046 (2013.01); H04L 67/02 (2013.01); H04L 67/42 (2013.01); H04L 2209/38 (2013.01)

(58) Field of Classification Search
None
See application file for complete search history.

(56) References Cited

U.S. PATENT DOCUMENTS

| | | | |
|---|---|---|---|
| 9,282,898 B2 | 3/2016 | McRoberts et al. | |
| 10,031,947 B2 * | 7/2018 | Daga | G06F 16/24569 |
| 10,032,244 B2 * | 7/2018 | Manevitch | G06T 1/20 |
| 10,715,323 B2 * | 7/2020 | Chan | H04L 9/30 |
| 10,789,308 B2 * | 9/2020 | Song | G06F 3/04817 |
| 11,012,430 B1 * | 5/2021 | Hufker | G06F 21/606 |
| 11,113,385 B2 * | 9/2021 | Dhavali | G06F 21/52 |
| 11,146,383 B1 * | 10/2021 | Marquardt | H04L 9/3236 |
| 2014/0047548 A1 * | 2/2014 | Bye | G06F 21/604 726/26 |
| 2014/0279997 A1 * | 9/2014 | Chiussi | G06F 16/335 707/706 |

(Continued)

*Primary Examiner* — Lashonda T Jacobs

(57) ABSTRACT

A mobile communication device. The device comprises a central processing unit (CPU), a graphics processing unit (GPU), and a memory comprising a mobile application incorporating a search client that. When executed by at least one of the CPU and the GPU, the application receives an input selecting the search client, begins execution in a trusted security zone execution mode wherein instructions of the search client execute in the GPU, creates a genesis block of a block chain via the search client instructions executing in the GPU, creates an event block of the block chain via the search client instructions executing in the GPU, attaches the event block to the block chain via the search client instructions executing in the GPU, transmits the block chain to a data store, and reverts to execution in a normal execution mode.

20 Claims, 9 Drawing Sheets

(56) References Cited

U.S. PATENT DOCUMENTS

| | | | |
|---|---|---|---|
| 2019/0102409 A1* | 4/2019 | Shi | H04L 67/1097 |
| 2019/0207995 A1* | 7/2019 | Gonzales, Jr. | H04L 9/3247 |
| 2019/0317970 A1* | 10/2019 | Chung | G06F 16/957 |
| 2020/0034928 A1* | 1/2020 | Lim | G01S 5/0205 |
| 2021/0027289 A1* | 1/2021 | Guo | G06F 16/27 |

* cited by examiner

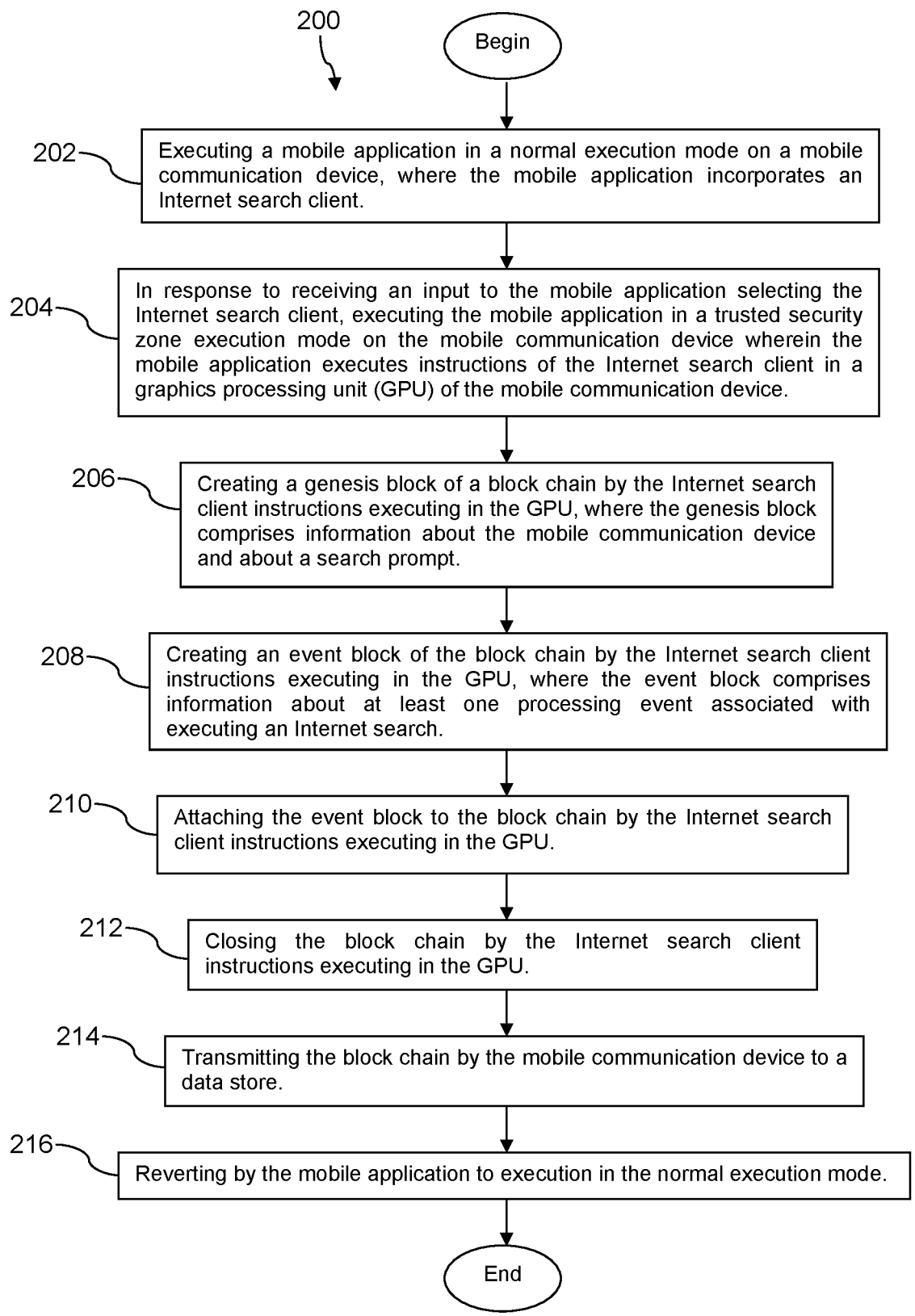

PERFORMANCE METRICS COLLECTION AND PROMULGATION FROM WITHIN A MOBILE APPLICATION

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Mobile communication devices are widely deployed and used by people in all walks of life in the United States and other nations. Mobile communication devices provide both voice communication services and data communication services. People can hold voice conversations with others via their mobile communication devices. People can access the Internet and download content via browsers executing on their mobile communication devices. Additionally, mobile applications or computer programs may be installed on the mobile communication device. When executed, the mobile applications may process autonomously on the mobile communication device. The mobile applications may also interact with application servers that assist the mobile applications in some way. In some cases, the mobile application may be deployed as a client having limited capabilities that executes on the mobile communication device that interworks with a server application that executes on a server computer accessible via a wireless connection from the mobile communication device. Mobile communication devices may have an operating system installed that provides an execution environment. This operating system may constrain or limit what mobile applications are able to do.

SUMMARY

In an embodiment, a method of performing an Internet search from within a mobile application is disclosed. The method comprises executing a mobile application in a normal execution mode on a mobile communication device, where the mobile application incorporates an Internet search client, in response to receiving an input to the mobile application selecting the Internet search client, executing the mobile application in a trusted security zone execution mode on the mobile communication device wherein the mobile application executes instructions of the Internet search client in a graphics processing unit (GPU) of the mobile communication device, and creating a genesis block of a block chain by the Internet search client instructions executing in the GPU, where the genesis block comprises information about the mobile communication device and about a search prompt. The method further comprises creating an event block of the block chain by the Internet search client instructions executing in the GPU, where the event block comprises information about at least one processing event associated with executing an Internet search, attaching the event block to the block chain by the Internet search client instructions executing in the GPU, closing the block chain by the Internet search client instructions executing in the GPU, transmitting the block chain by the mobile communication device to a data store, and reverting by the mobile application to execution in the normal execution mode.

In another embodiment, a mobile communication device is disclosed. The mobile communication device comprises a central processing unit (CPU), a graphics processing unit (GPU), and a non-transitory memory comprising a mobile application incorporating an Internet search client. When executed by at least one of the CPU and the GPU, the mobile application receives an input selecting the Internet search client. In response to the input, the mobile application begins execution in a trusted security zone execution mode wherein instructions of the Internet search client execute in the GPU. The mobile application creates a genesis block of a block chain via the Internet search client instructions executing in the GPU, where the genesis block comprises information about the mobile communication device and about a search prompt. The mobile application further creates an event block of the block chain via the Internet search client instructions executing in the GPU, where the event block comprises information about at least one processing event associated with executing an Internet search. The mobile application attaches the event block to the block chain via the Internet search client instructions executing in the GPU, transmits the block chain to a data store, and reverts to execution in a normal execution mode.

In yet another embodiment, a method of executing a mobile application is disclosed. The method comprises executing a mobile application in a normal execution mode on a mobile communication device, where the mobile application incorporates an event monitoring agent, in response to receiving an input to the mobile application, executing the mobile application in a trusted security zone execution mode on the mobile communication device, and creating a genesis block of a block chain by the mobile application executing in the trusted security zone execution mode, where the genesis block comprises information about the mobile communication device and about the mobile application. The method further comprises creating an event block of the block chain by the event monitoring agent executing in the trusted security zone execution mode, where the event block comprises information about at least one processing event associated with executing the mobile application, attaching the event block to the block chain by the event monitoring agent executing in the trusted security zone execution mode, transmitting the block chain by the mobile application to a data store, and reverting by the mobile application to execution in the normal execution mode.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

FIG. 3 is a flow chart of a method according to an embodiment of the disclosure.

DETAILED DESCRIPTION

Figure 1:
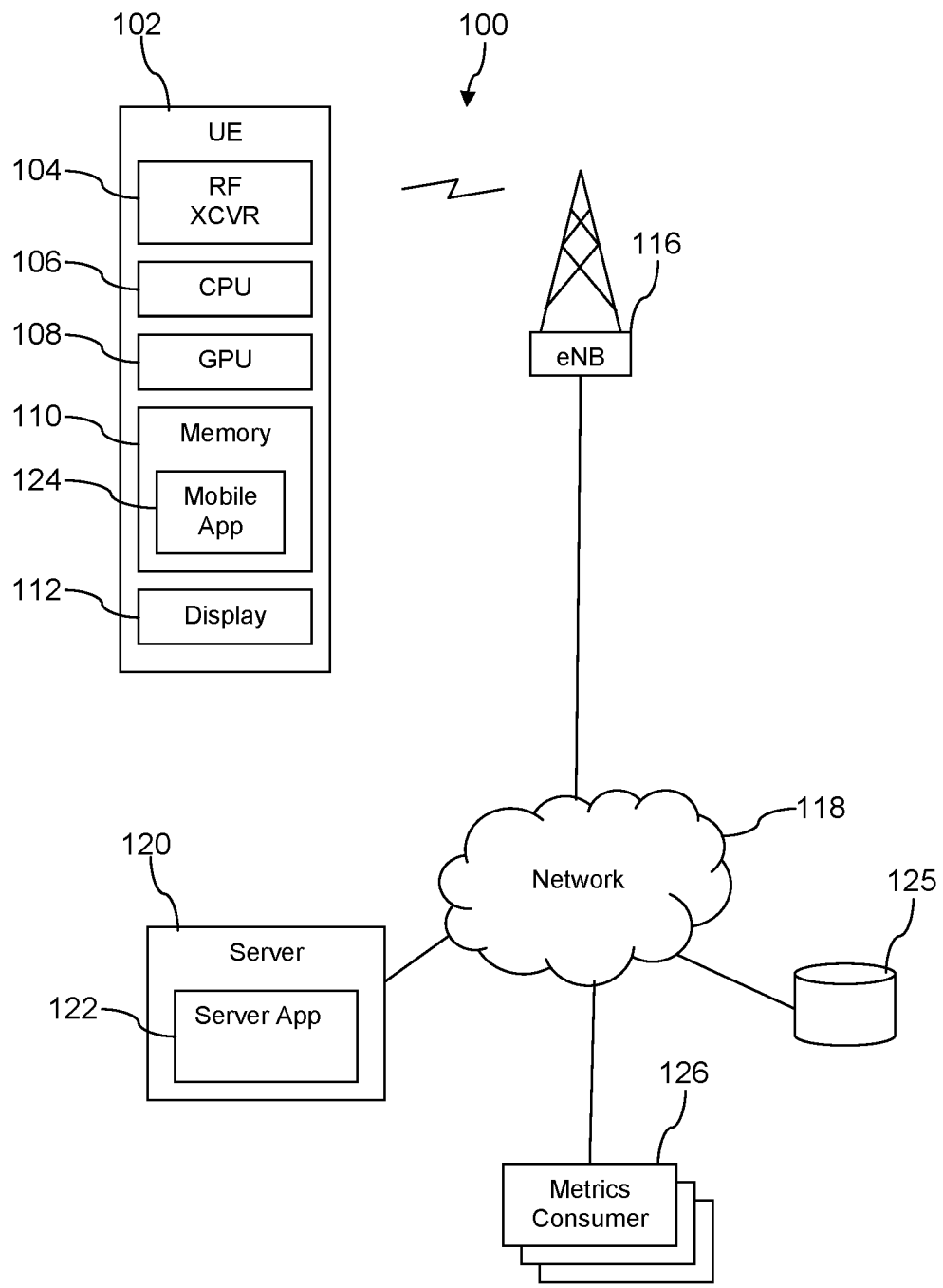
FIG. 1 is a block diagram of a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Mobile applications installed on a mobile communication device may desirably capture a record of execution events and transmit this record of execution events to a data store external to the mobile communication device. Some of these execution events may comprise mobile application and/or mobile communication device performance metrics. It may be desired that such records be secured and trustworthy. Said in other words, it may be desired that the capturing, recording, and transmission of execution events be reasonably secured against falsification. In some circumstances accomplishing these goals may be problematic. For example, in some circumstances an operating system that the mobile applications execute on top of may not provide inherent support for such enhanced security at an application execution level. The present disclosure teaches a system and methods for providing such enhanced security for mobile applications.

Mobile applications may be downloaded from the Internet and installed on a mobile communication device after the device is manufactured, purchased by a user, and activated to receive wireless communication service. These may be referred to as user applications, user installed applications, and/or third party applications. Because the original equipment manufacturer (OEM) of the mobile communication device has little control over such third party applications (e.g., the OEM has not tested the third party application to verify its compatibility with the device, its freedom from defects, or its freedom from malware), often the operating system support for third party applications is restricted relative to system applications that were installed by the OEM.

The present disclosure teaches a third party application that incorporates instructions that cause the third party application to be executed in a trusted security zone (TSZ) of the mobile communication device (e.g., executed in a TSZ execution mode). Trusted security zones and associated processing are discussed further hereinafter. These instructions executing in the TSZ create an initial or genesis block of a block chain, where the genesis block comprises information about the mobile communication device and the context of the execution of the third party application, add one or more event blocks to the block chain (where each event block captures information about events occurring during execution of the third party application), and completes the block chain when the instructions have completed their task. A block chain is a form of data structure where each subsequent block is linked logically to the preceding block. For example, each block (with the exception of the first block or genesis block) may comprise a hash calculated over the preceding block of the block chain, a nonce value, data captured or stored by the block, and a hash of the block itself calculated over the hash of the preceding block, the nonce, and the data. Typically the nonce is determined via trial and error to satisfy a desired constraint on the form of the hash of the block itself, for example a form having a predefined number of leading zeros in the hash of the block itself. In an embodiment, a nonce is an arbitrarily determined integer, for example an integer generated by a pseudo-random number generator.

The third party application transmits the completed block chain to a data store external to the mobile communication device, for example to a data store communicatively coupled to the Internet. The transmission of the completed block chain to the data store may be performed while the third party application executes in the TSZ. Alternatively, the transmission of the completed block chain to the data store may be performed while the third party application executes in a normal execution mode, after reversion from the TSZ execution mode. In this later case, in an embodiment, the third party application may cause the completed block chain to be encrypted (e.g., by calling encryption services from the operating system of the mobile communication device or from a library of system support functions) and then transmits the encrypted completed block chain to the data store external to the mobile communication device. In an embodiment, the completed block chain first may be encrypted, and second the encrypted block chain may be transmitted while the third party application executes in the TSZ to the data store. The data store may store the completed block chain in encrypted form or, alternatively, may first decrypt the completed block chain and second store the completed block chain in decrypted form.

It is noted that such execution of the third party application or portions of the third party application in the TSZ execution mode can provide the benefit not only of providing secure and trustworthy reports (e.g., the event block chain described above) of events occurring within the subject third party application but also can secure other applications on the mobile communication device from that subject third party application. For example, when the third party application executes in the TSZ execution mode, the portions of memory that are not part of the TSZ and where the other applications may be stored are not accessible to the TSZ. The data store may be made accessible to a variety of stake holders who are able to present the appropriate user identities and passwords. The stake holders may be a developer of the third party application, a proprietor of an Internet search capability embedded in the third party application, a wireless communication service provider who provides wireless communication service to the mobile communication device, and/or other authorized entities.

In an embodiment, a mobile application (e.g., a third party application) incorporates an Internet search client that, when the mobile application executes on a mobile communication device, may reach out to conduct a search via the Internet, for example by interworking with an Internet search server application external to the mobile communication device. The search may be conducted based on one or more search prompts input by a user. In some circumstances it may be challenging for the mobile application to report this search activity back to a data store where stake holders can analyze this search activity. This information may be used for a variety of purposes, including adapting the search server application algorithms and/or rules to provide improved searching capability. By configuring the Internet search client to cause processing on the mobile communication device to execute in a TSZ execution mode, the Internet search client can both conduct an Internet search securely and capture a report of that search activity that can be trusted to be accurate and free from falsification.

In an embodiment, in response to receiving an input to the mobile application to conduct an Internet search, the mobile application causes the mobile communication device to execute instructions of an Internet search client that are embedded in the mobile application in a TSZ execution mode. This may entail the mobile application requesting the operating system to execute the mobile application or a portion of the mobile application (e.g., at least some of the Internet search client instructions) in the TSZ execution mode. In an embodiment, the Internet search client instructions are executed by a graphics processor unit (GPU) of the mobile communication device in the TSZ execution mode, whereby the Internet search client can present search results in a display of the mobile communication device and receive user inputs to the Internet search client as well as communicate via a radio transceiver (e.g., a radio modem) of the mobile communication device with the search server application.

The Internet search client executing in the GPU creates a genesis block that is the start of a block chain recording the Internet search. The genesis block comprises information about the mobile communication device, about the Internet search client, and about a search prompt. The genesis block may identify the mobile communication device by a telephone number, by a mobile equipment identity (MEID), or by another identity. The genesis block may identify a brand or make of the mobile communication device and a model of the mobile communication device. The genesis block may identify the mobile application from within which the Internet search client is invoked. The genesis block may identify the Internet search client and a version identity of the client. The genesis block may identify a search prompt or search string input by a user. The genesis block may identify the Internet search client by name. The genesis block may comprise an indication of the current location of the mobile communication device.

The Internet search client creates one or more event blocks that comprise information recording events that occur during the processing of the Internet search. These event blocks may comprise information about results returned by the Internet search server application to the Internet search client and inputs to the Internet search client by a user of the mobile communication device (e.g., inputs provided by the user as the search progresses). An event block may comprise search results. The event block may comprise information about an elapsed time between a search request and a search result. The event block may comprise information about a wireless bandwidth available to the mobile communication device during the elapsed time, for example a number of sub-channels allocated to the device. As each event block is created, the Internet search client attaches and/or appends it to the end of the block chain. When the Internet search has completed, the Internet search client closes the block chain. The Internet search client may close the block chain by creating a terminal block and attaching it to the end of the block chain. The completed block chain is then transmitted to a data store external to the mobile communication device. In an embodiment, the completed block chain may be transmitted by the Internet search client while it is executing on the GPU. When transmitted while the Internet search client is executing on the GPU in the TSZ execution mode, the completed block chain may be transmitted over a trusted end-to-end communication link to the data store. For more details on establishing trusted end-to-end communication links relying on hardware assisted security (e.g., TSZ), see U.S. Pat. No. 9,282,898, filed Jun. 25, 2012, entitled "End-to-end Trusted Communications Infrastructure," by Leo Michael McRoberts, et al., which is hereby incorporated by reference in its entirety. Alternatively, in an embodiment, the Internet search client may first cause execution of the mobile application to revert from execution in the TSZ execution mode to the normal execution mode, and the completed block chain may second be transmitted by the Internet search client or by the mobile application to the data store. In this later case, in an embodiment, the Internet search client or the mobile application first may cause the completed block chain to be encrypted (e.g., by calling encryption services from the operating system of the mobile communication device or from a library of system support functions) and second may transmit the encrypted completed block chain to the data store external to the mobile communication device. In an embodiment, the completed block chain first may be encrypted and second the encrypted block chain may be transmitted via a trusted end-to-end communication link to the data store. The data store may store the completed block chain in encrypted form or, alternatively, may first decrypt the completed block chain and then store the completed block chain in decrypted form.

Because it was created and built in the TSZ execution mode, the completed block chain transmitted to and stored in the data store is deemed to be authentic and unfalsified. The data store may provide access to the completed block chains that record different Internet searches completed by a large number of different mobile communication devices to a proprietor of the Internet search server application, to a developer of the third party application embedding the Internet search client, and to a wireless service provider, whereby to reconcile service level agreements (SLAs) and other business agreements among them.

In an embodiment, a mobile application (e.g., a media player) incorporates an event monitor that executes in a TSZ execution mode on the mobile communication device (e.g., in a central processor unit (CPU) or in a digital signal processor (DSP) of the device), creates a genesis block to establish a block chain, creates and appends event blocks to the block chain, completes the block chain, and transmits the block chain to a data store external to the mobile communication device. The event monitor may capture when and how often content is played by the media player. The event monitor may capture events such as pausing playback, rewinding playback, skipping playback of tracks, skipping advertisements, and other events. The event monitor may create event blocks that comprise information about a play input event, a pause input event, a skip input event. The event blocks may identify an item of content. Some of this event information may comprise performance metrics. The collection of this event information captured while the event monitor executes in a TSZ execution mode may be deemed to be authentic and unfalsified. This information can be valuable to artists who create the content, for example for evaluating the public response to their creations. The system and methods described herein may advantageously be applied to other mobile applications to capture events and/or performance metrics associated with execution of the mobile application on the mobile communication device in a secure and unfalsified manner and to store them in a data store external to the mobile communication device.

A trusted security zone provides chipsets with a hardware root of trust, a secure execution environment for applications, and secure access to peripherals. A hardware root of trust means the chipset should only execute programs intended by the device manufacturer or vendor and resists software and physical attacks, and therefore remains trusted to provide the intended level of security. The chipset architecture is designed to promote a programmable environment that allows the confidentiality and integrity of assets to be protected from specific attacks. Trusted security zone capabilities are becoming features in both wireless and fixed hardware architecture designs. Providing the trusted security zone in the main mobile communication device chipset and protecting the hardware root of trust removes the need for separate secure hardware to authenticate the device or user. To ensure the integrity of the applications requiring trusted data, such as a mobile financial services application, the trusted security zone also provides the secure execution environment where only trusted applications can operate, safe from attacks. Security is further promoted by restricting access of non-trusted applications to peripherals, such as data inputs and data outputs, while a trusted application is running in the secure execution environment. In an embodiment, the trusted security zone may be conceptualized as hardware assisted security.

A complete trusted execution environment (TEE) may be implemented through the use of the trusted security zone hardware and software architecture. The trusted execution environment is an execution environment that is parallel to the execution environment of the main mobile communication device operating system. The trusted execution environment and/or the trusted security zone may provide a base layer of functionality and/or utilities for use of applications that may execute in the trusted security zone. For example, in an embodiment, trust tokens may be generated by the base layer of functionality and/or utilities of the trusted execution environment and/or trusted security zone for use in trusted end-to-end communication links to document a continuity of trust of the communications. For more details on establishing trusted end-to-end communication links relying on hardware assisted security, see U.S. Pat. No. 9,282,898, filed Jun. 25, 2012, entitled "End-to-end Trusted Communications Infrastructure," by Leo Michael McRoberts, et al., which was incorporated by reference above. Through standardization of application programming interfaces (APIs), the trusted execution environment becomes a place to which scalable deployment of secure services can be targeted. A device which has a chipset that has a trusted execution environment on it may exist in a trusted services environment, where devices in the trusted services environment are trusted and protected against attacks. The trusted execution environment can be implemented on mobile phones and tablets as well as extending to other trusted devices such as personal computers, servers, sensors, medical devices, point-of-sale terminals, industrial automation, handheld terminals, automotive, etc.

The trusted security zone is implemented by partitioning all of the hardware and software resources of the mobile communication device into two partitions: a secure partition and a normal partition. Placing sensitive resources in the secure partition can protect against possible attacks on those resources. For example, resources such as trusted software applications may run in the secure partition and have access to hardware peripherals such as a touchscreen or a secure location in memory. Less secure peripherals such as wireless radios may be disabled completely while the secure partition is being accessed, while other peripherals may only be accessed from the secure partition. While the secure partition is being accessed through the trusted execution environment, the main mobile operating system in the normal partition is suspended, and applications in the normal partition are prevented from accessing the secure peripherals and data. This prevents corrupted applications or malware applications from breaking the trust of the device.

The trusted security zone is implemented by partitioning the hardware and software resources to exist in a secure subsystem which is not accessible to components outside the secure subsystem. The trusted security zone is built into the processor architecture at the time of manufacture through hardware logic present in the trusted security zone which enables a perimeter boundary between the secure partition and the normal partition. The trusted security zone may only be manipulated by those with the proper credential and, in an embodiment, may not be added to the chip after it is manufactured. Software architecture to support the secure partition may be provided through a dedicated secure kernel running trusted applications. Trusted applications are independent secure applications which can be accessed by normal applications through an application programming interface in the trusted execution environment on a chipset that utilizes the trusted security zone.

In an embodiment, the normal partition applications run on a first virtual processor, and the secure partition applications run on a second virtual processor. Both virtual processors may run on a single physical processor, executing in a time-sliced fashion, removing the need for a dedicated physical security processor. Time-sliced execution comprises switching contexts between the two virtual processors to share processor resources based on tightly controlled mechanisms such as secure software instructions or hardware exceptions. The context of the currently running virtual processor is saved, the context of the virtual processor being switched to is restored, and processing is restarted in the restored virtual processor. Time-sliced execution protects the trusted security zone by stopping the execution of the normal partition while the secure partition is executing.

The two virtual processors context switch via a processor mode called monitor mode when changing the currently running virtual processor. The mechanisms by which the processor can enter monitor mode from the normal partition are tightly controlled. The entry to monitor mode can be triggered by software executing a dedicated instruction, the Secure Monitor Call (SMC) instruction, or by a subset of the hardware exception mechanisms such as hardware interrupts, which can be configured to cause the processor to switch into monitor mode. The software that executes within monitor mode then saves the context of the running virtual processor and switches to the secure virtual processor.

The trusted security zone runs a separate operating system that is not accessible to the device users. For security purposes, the trusted security zone is not open to users for installing applications, which means users do not have access to install applications in the trusted security zone. This prevents corrupted applications or malware applications from executing powerful instructions reserved to the trusted security zone and thus preserves the trust of the device. The security of the system is achieved at least in part by partitioning the hardware and software resources of the mobile phone so they exist in one of two partitions, the secure partition for the security subsystem and the normal partition for everything else. Placing the trusted security zone in the secure partition and restricting access from the normal partition protects against software and basic hardware attacks. Hardware logic ensures that no secure partition resources can be accessed by the normal partition components or applications. A dedicated secure partition operating system runs in a virtual processor separate from the normal partition operating system that likewise executes in its own virtual processor. Users may install applications on the mobile communication device which may execute in the normal partition operating system described above. The trusted security zone runs a separate operating system for the secure partition that is installed by the mobile communication device manufacturer or vendor, and users are not able to install new applications in or alter the contents of the trusted security zone.

Turning now to FIG. 1, a system 100 is described. In an embodiment, system 100 comprises a mobile communication device (user equipment—UE) 102 that comprises a radio transceiver 104, a central processing unit (CPU) 106, a graphics processor unit (GPU) 108, a memory 110, and a display 112. The UE 102 may be one of a mobile phone, a smart phone, a personal digital assistant (PDA), a wearable computer, a headset computer, a laptop computer, a notebook computer, or a tablet computer. The UE 102 may establish a radio communication link to a cell site 116 according to one or more of a long term evolution (LTE), a code division multiple access (CDMA), a global system for mobile communications (GSM), or a worldwide interoperability for microwave access (WiMAX) telecommunication protocol. The UE 102 may establish a radio communication link to the cell site 116 using a 5G telecommunication protocol. The cell site 116 provides connectivity of the UE 102 to a network 118. In an embodiment, the UE 102 further comprises a WiFi radio transceiver that may establish a wireless link to a WiFi access point (not shown), and the WiFi access point may communicatively couple the UE 102 to the network 118. The network 118 comprises one or more private networks, one or more public networks, or a combination thereof. The system 100 comprises any number of UEs 102 and any number of cell sites 116.

The memory 110 comprises a non-transitory portion that stores one or more mobile applications 124. In an embodiment, the mobile application 124 may encapsulate an Internet search client that communicates with a server 120 via the cell site 116 and via the network 118 to complete Internet searches. The Internet search client may build a block chain that records information pertinent to the Internet searching activity and transmit this block chain to a data store 125. One or more metrics consumers 126 may access the data store 125 to read the block chains stored there by UEs 102. The metrics consumers may be developers of the mobile application 124, a proprietor of the Internet search server application 122, a wireless service provider that provides radio communication service to the UE 102, and others. The system 100 comprises any number of servers 120 and any number of data stores 124. In an embodiment, the mobile application 124 may encapsulate an event monitor that build a block chain that records events occurring during the processing of the mobile application 124 and transmit this block chain to the data store 125.

Figure 2A:
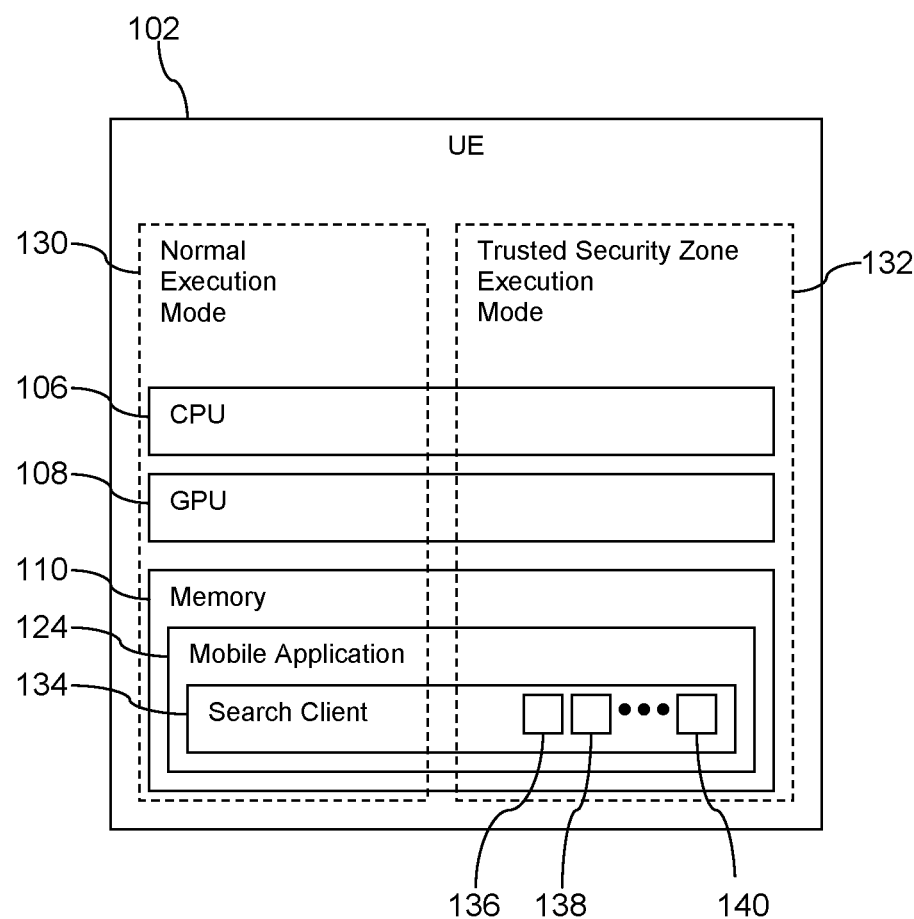
FIG. 2A is a block diagram of a mobile communication device according to an embodiment of the disclosure.

Turning now to FIG. 2A, details of an embodiment of the UE 102 are described. In an embodiment, the mobile application 124 comprises an Internet search client 134. The UE 102 is configured to be able to execute instructions in both a normal execution mode 130 and in a trusted security zone (TSZ) execution mode 132. The CPU 106 and the GPU 108 are both configured to be capable of executing instructions in either the normal execution mode 130 or the TSZ execution mode 132. In an embodiment, the memory 110 may comprise a portion associated with the normal execution mode 130 and a portion associated with the TSZ execution mode 132. When the search client 134 (or a selection of instructions of the search client 134) is executed in the TSZ execution mode 132, the search client 134 may build a block chain comprising a genesis block 136, a plurality of event blocks 138, and a terminal block 140.

The mobile application 124 may be a mobile video game. The mobile application 124 may be an investment application. The mobile application 124 may be a special interest application, such as a wine amateur application, a bird watcher application, an amateur astronomy application, an amateur photographer application. Any of these different special interest applications may embedded an Internet search client to enable the user to conduct Internet searches from within the amateur interest application.

Figure 2B:
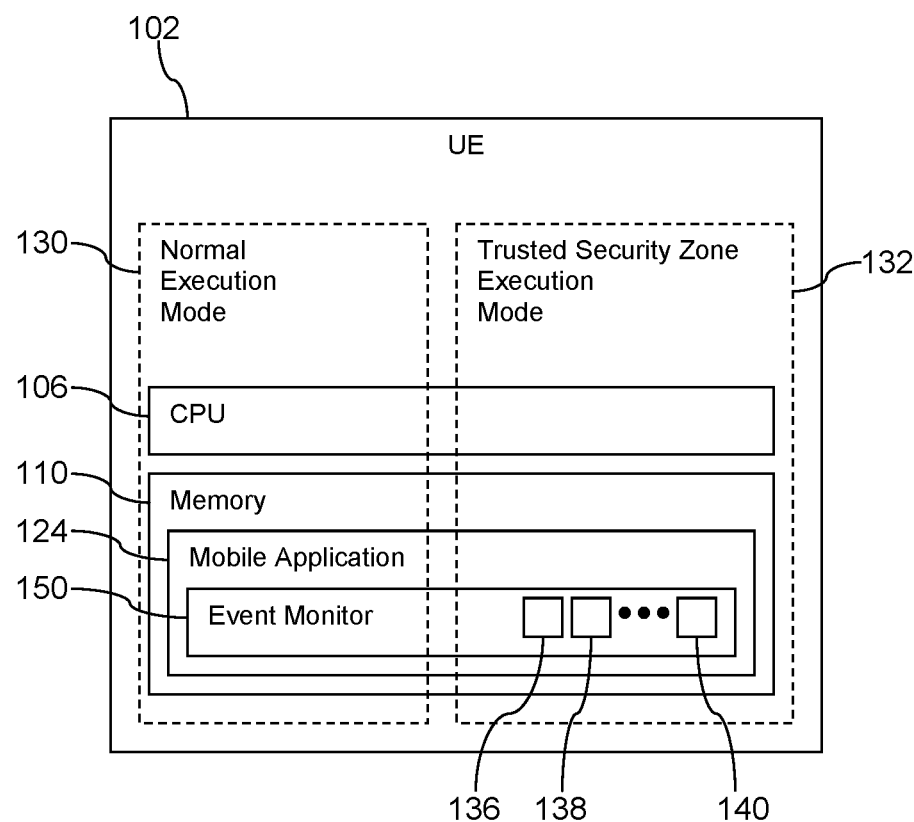
FIG. 2B is a diagram of a mobile communication device according to another embodiment of the disclosure.

Turning now to FIG. 2B, details of another embodiment of the UE 102 are described. In an embodiment, the mobile application 124 comprises an event monitor 150. When the mobile application 124 executes, at least a portion of the event monitor 150 executes in the TSZ execution mode 132. For example, the mobile application 124 may execute instructions, and the event monitor 150 executing in the normal execution mode 130 keeps track of what the mobile application 124 does and keeps track of process values and/or user inputs. When the mobile application 124 has completed execution and is preparing to shut down, the event monitor 150 requests to execute in the TSZ execution mode 132. The event monitor 150 may build a block chain comprising a genesis block 136, a plurality of event blocks 138, and a terminal block 140. The event blocks 138 may store the events that occurred during execution of the mobile application 124 and the process values and/or user inputs. The event monitor 150 may transmit the block chain to the data store 125 while it is executing in the TSZ execution mode 132, and then the event monitor 150 may revert to the normal execution mode 130. Alternatively, the event monitor 150 may revert to the normal execution mode 130, and then transmit the block chain to the data store 125 while it is executing in the normal execution mode 130. In an embodiment, the mobile application may be a media player, and the event monitor 150 may monitor and capture media playback events and/or user input events.

Turning now to FIG. 3, a method 200 is described. In an embodiment, the method 200 is a method of performing an Internet search from within a mobile application. At block 202, the method 200 comprises executing a mobile application in a normal execution mode on a mobile communication device, where the mobile application incorporates an Internet search client. The mobile application may be a gaming application. The mobile application may be a special interest application. The mobile application may be a restaurant finding application. At block 204, the method 200 comprises, in response to receiving an input to the mobile application selecting the Internet search client, executing the mobile application in a trusted security zone (TSZ) execution mode on the mobile communication device wherein the mobile application executes instructions of the Internet search client in a graphics processing unit (GPU) of the mobile communication device. In another embodiment, the mobile application executes instructions of the Internet search client in a central processing unit (CPU) of the mobile communication device, in a digital signal processor (DSP) of the mobile communication device, in a field programmable gate array (FPGA) of the mobile communication device, or in an application integrated circuit (ASIC) of the mobile communication device.

At block 206, the method 200 comprises creating a genesis block of a block chain by the Internet search client instructions executing in the GPU, where the genesis block comprises information about the mobile communication device and about a search prompt. In an embodiment, the genesis block may comprise additional information such as one or more of an identity of the Internet search client, a version identity of the Internet search client, a location of the mobile communication device, or an identity of a cell site from which the mobile communication device receives a wireless communication link. At block 208, the method 200 comprises creating an event block of the block chain by the Internet search client instructions executing in the GPU, where the event block comprises information about at least one processing event associated with executing an Internet search. The processing event may comprise a user input of a search prompt or a search string. The processing event may comprise a result of an Internet search. The processing event may comprise a search error message.

At block 210, the method 200 comprises attaching the event block to the block chain by the Internet search client instructions executing in the GPU. At block 212, the method 200 comprises closing the block chain by the Internet search client instructions executing in the GPU. In an embodiment, the processing of block 212 does not occur and the block chain is closed simply by not adding additional event blocks to the block chain.

At block 214, the method 200 comprises transmitting the block chain by the mobile communication device to a data store. In an embodiment, the processing of block 214 happens while the Internet search client instructions are executing in the GPU. In an embodiment, the processing of block 214 happens while the Internet search client instructions are executing in the TSZ execution mode in the GPU. At block 216, the method 200 comprises reverting by the mobile application to execution in the normal execution mode. In an embodiment, the processing of block 214 happens after the mobile application reverts to execution in the normal execution mode.

Figure 4:
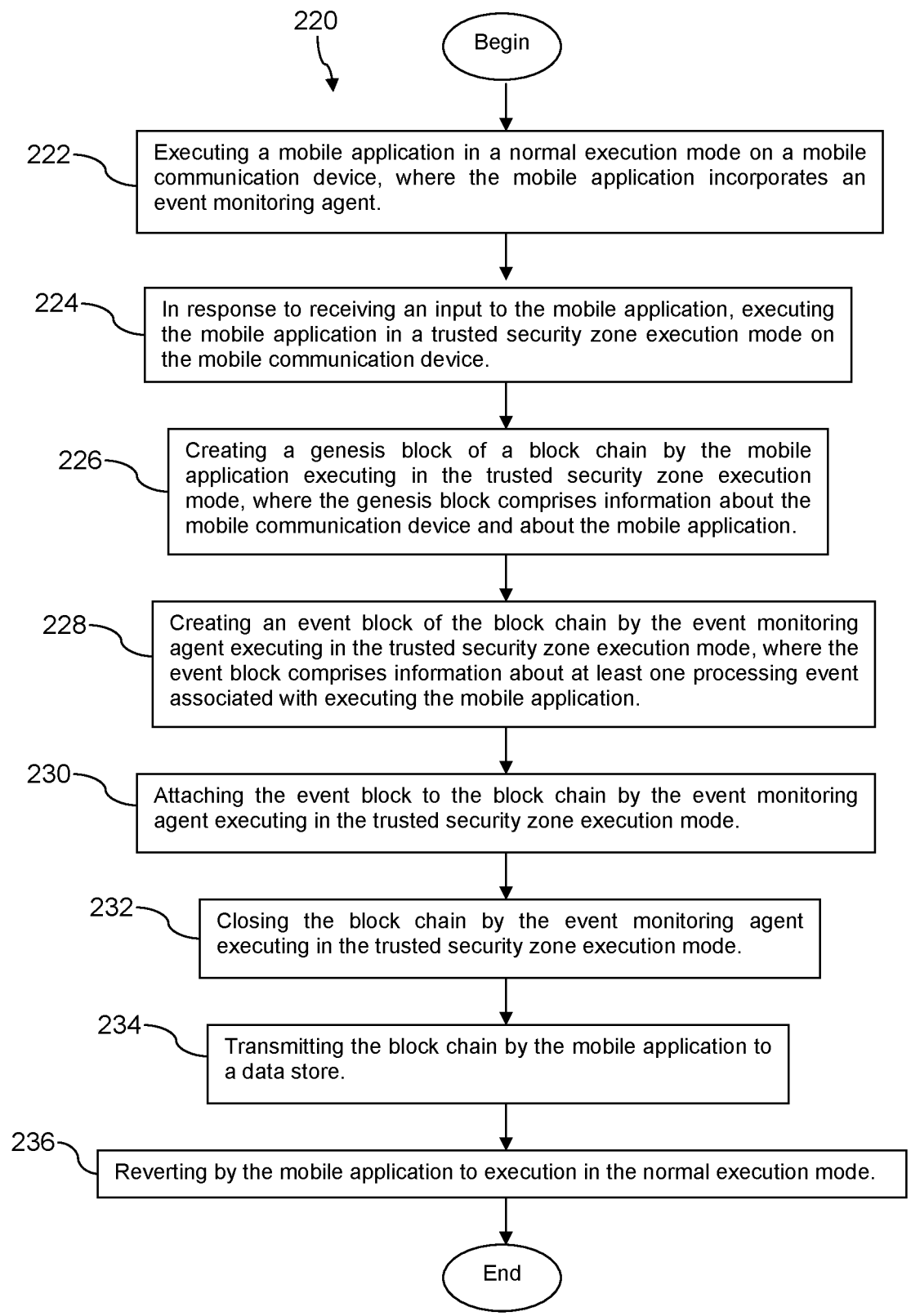
FIG. 4 is a flow chart of another method according to an embodiment of the disclosure.

Turning now to FIG. 4, a method 220 is described. In an embodiment, method 200 is a method of executing a mobile application. At block 222, the method 220 comprises executing a mobile application in a normal execution mode on a mobile communication device, where the mobile application incorporates an event monitoring agent. At block 224, the method 220 comprises, in response to receiving an input to the mobile application, executing the mobile application in a trusted security zone execution mode on the mobile communication device.

At block 226, the method 220 comprises creating a genesis block of a block chain by the mobile application executing in the trusted security zone (TSZ) execution mode, where the genesis block comprises information about the mobile communication device and about the mobile application. At block 228, the method 220 comprises creating an event block of the block chain by the event monitoring agent executing in the trusted security zone execution mode, where the event block comprises information about at least one processing event associated with executing the mobile application.

At block 230, the method 220 comprises attaching the event block to the block chain by the event monitoring agent executing in the trusted security zone execution mode. At block 232, the method 220 comprises closing the block chain by the event monitoring agent executing in the trusted security zone execution mode. In an embodiment, the processing of block 232 does not occur and the block chain is closed simply by not adding additional event blocks to the block chain.

At block 234, the method 220 comprises transmitting the block chain by the mobile application to a data store. At block 236, the method 220 comprises reverting by the mobile application to execution in the normal execution mode.

Figure 5:
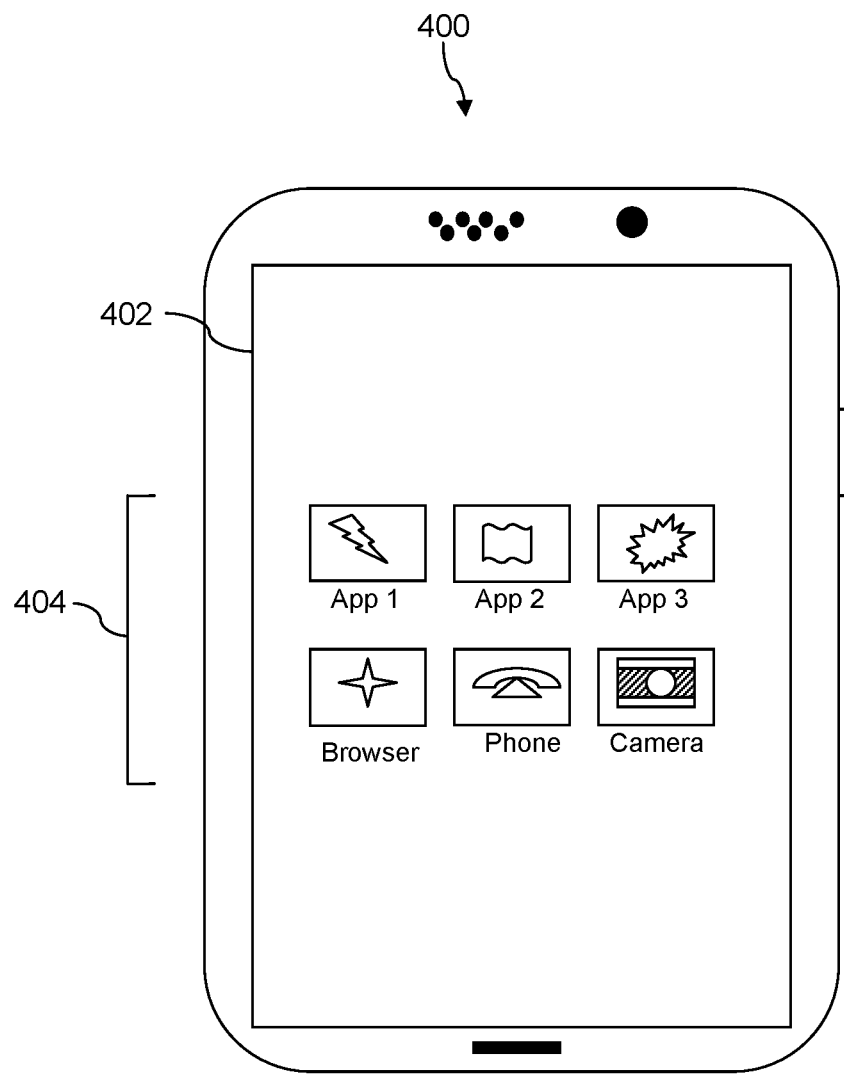
FIG. 5 is an illustration of a mobile communication device according to an embodiment of the disclosure.

FIG. 5 depicts the user equipment (UE) 400, which is operable for implementing aspects of the present disclosure, but the present disclosure should not be limited to these implementations. Though illustrated as a mobile phone, the UE 400 may take various forms including a wireless handset, a pager, a personal digital assistant (PDA), a gaming device, or a media player. The UE 400 includes a touchscreen display 402 having a touch-sensitive surface for input by a user. A small number of application icons 404 are illustrated within the touch screen display 402. It is understood that in different embodiments, any number of application icons 404 may be presented in the touch screen display 402. In some embodiments of the UE 400, a user may be able to download and install additional applications on the UE 400, and an icon associated with such downloaded and installed applications may be added to the touch screen display 402 or to an alternative screen. The UE 400 may have other components such as electro-mechanical switches, speakers, camera lenses, microphones, input and/or output connectors, and other components as are well known in the art. The UE 400 may present options for the user to select, controls for the user to actuate, and/or cursors or other indicators for the user to direct. The UE 400 may further accept data entry from the user, including numbers to dial or various parameter values for configuring the operation of the handset. The UE 400 may further execute one or more software or firmware applications in response to user commands. These applications may configure the UE 400 to perform various customized functions in response to user interaction. Additionally, the UE 400 may be programmed and/or configured over-the-air, for example from a wireless base station, a wireless access point, or a peer UE 400. The UE 400 may execute a web browser application which enables the touch screen display 402 to show a web page. The web page may be obtained via wireless communications with a base transceiver station, a wireless network access node, a peer UE 400 or any other wireless communication network or system.

Figure 6:
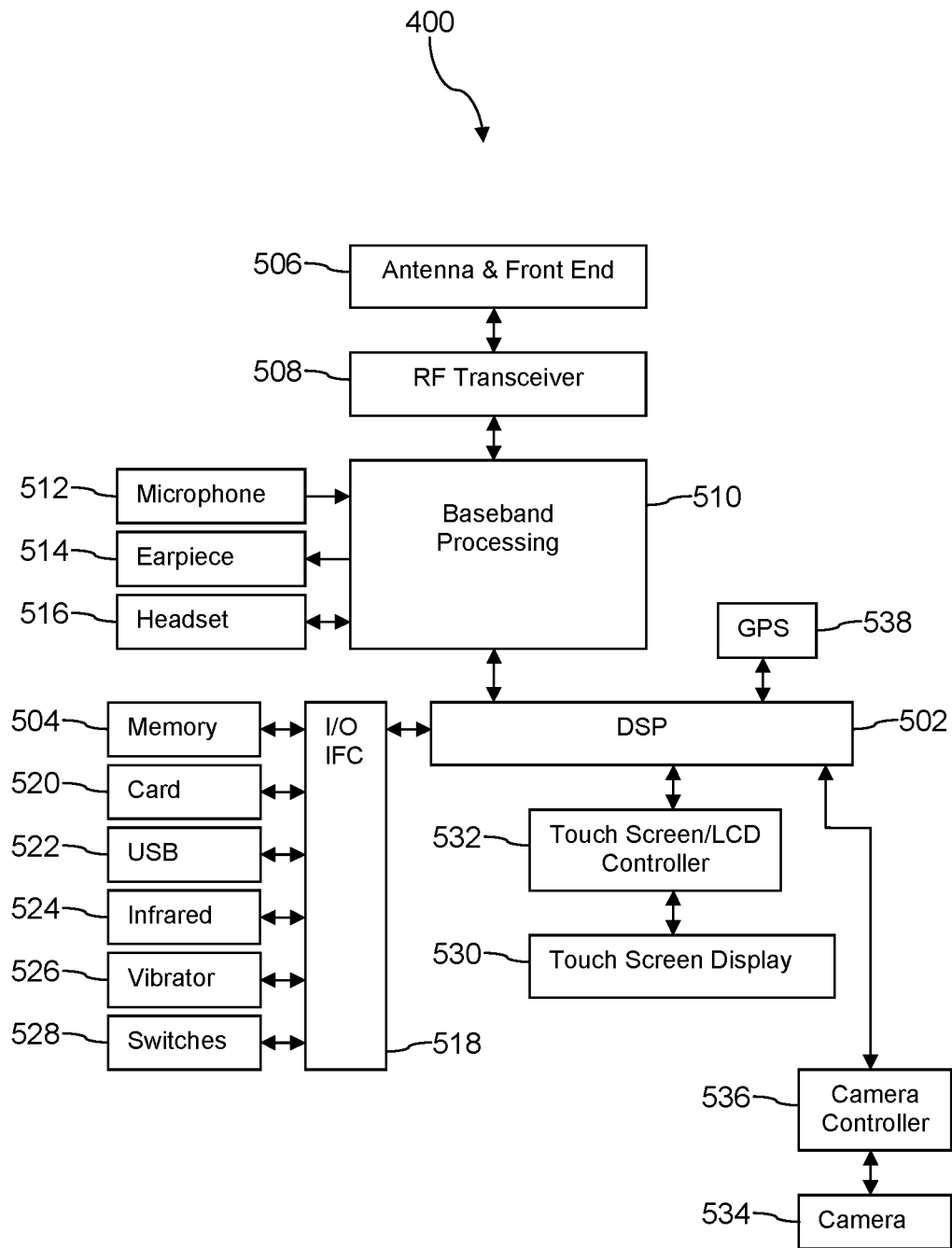
FIG. 6 is a block diagram of a hardware architecture of a mobile communication device according to an embodiment of the disclosure.

FIG. 6 shows a block diagram of the UE 400. While a variety of known components of handsets are depicted, in an embodiment a subset of the listed components and/or additional components not listed may be included in the UE 400. The UE 400 includes a digital signal processor (DSP) 502 and a memory 504. As shown, the UE 400 may further include an antenna and front end unit 506, a radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, one or more electro-mechanical switches 528, a touch screen liquid crystal display (LCD) with a touch screen display 530, a touch screen/LCD controller 532, a camera 534, a camera controller 536, and a global positioning system (GPS) receiver 538. In an embodiment, the UE 400 may include another kind of display that does not provide a touch sensitive screen. In an embodiment, the UE 400 may include both the touch screen display 530 and additional display component that does not provide a touch sensitive screen. In an embodiment, the DSP 502 may communicate directly with the memory 504 without passing through the input/output interface 518. Additionally, in an embodiment, the UE 400 may comprise other peripheral devices that provide other functionality.

The DSP 502 or some other form of controller or central processing unit operates to control the various components of the UE 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the UE 400 to function as a peripheral device to exchange information with a personal computer or other computer system. The infrared port 524 and other optional ports such as a Bluetooth® interface or an IEEE 802.11 compliant wireless interface may enable the UE 400 to communicate wirelessly with other nearby handsets and/or wireless base stations. In an embodiment, the UE 400 may comprise a near field communication (NFC) transceiver. The NFC transceiver may be used to complete payment transactions with point-of-sale terminals or other communications exchanges. In an embodiment, the UE 400 may comprise a radio frequency identify (RFID) reader and/or writer device.

The switches 528 may couple to the DSP 502 via the input/output interface 518 to provide one mechanism for the user to provide input to the UE 400. Alternatively, one or more of the switches 528 may be coupled to a motherboard of the UE 400 and/or to components of the UE 400 via a different path (e.g., not via the input/output interface 518), for example coupled to a power control circuit (power button) of the UE 400. The touch screen display 530 is another input mechanism, which further displays text and/or graphics to the user. The touch screen LCD controller 532 couples the DSP 502 to the touch screen display 530. The GPS receiver 538 is coupled to the DSP 502 to decode global positioning system signals, thereby enabling the UE 400 to determine its position.

Figure 7A:
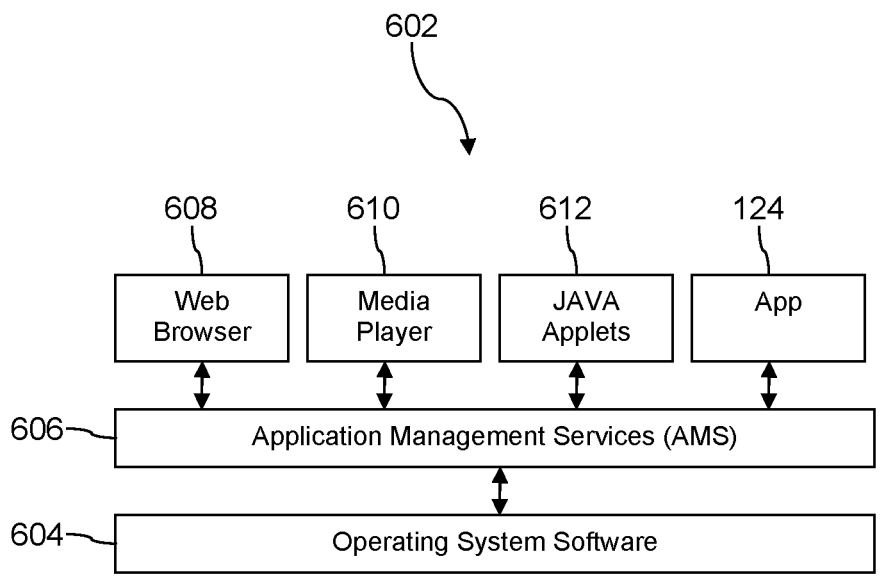
FIG. 7A is a block diagram of a software architecture of a mobile communication device according to an embodiment of the disclosure.

FIG. 7A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the UE 400. Also shown in FIG. 7A are a web browser application 608, a media player application 610, and JAVA applets 612. The web browser application 608 may be executed by the UE 400 to browse content and/or the Internet, for example when the UE 400 is coupled to a network via a wireless link. The web browser application 608 may permit a user to enter information into forms and select links to retrieve and view web pages. The media player application 610 may be executed by the UE 400 to play audio or audiovisual media. The JAVA applets 612 may be executed by the UE 400 to provide a variety of functionality including games, utilities, and other functionality.

Figure 7B:
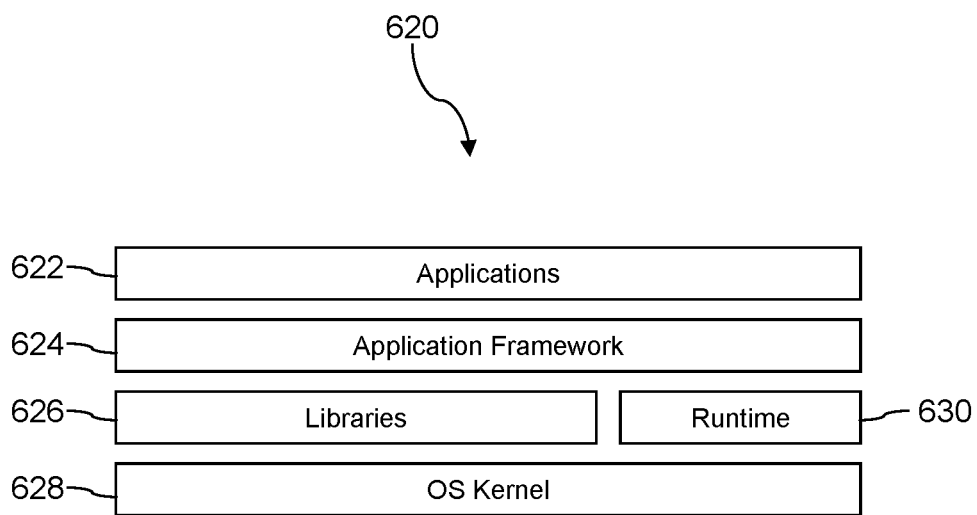
FIG. 7B is a block diagram of another software architecture of a mobile communication device according to an embodiment of the disclosure.

FIG. 7B illustrates an alternative software environment 620 that may be implemented by the DSP 502. The DSP 502 executes operating system kernel (OS kernel) 628 and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 8:
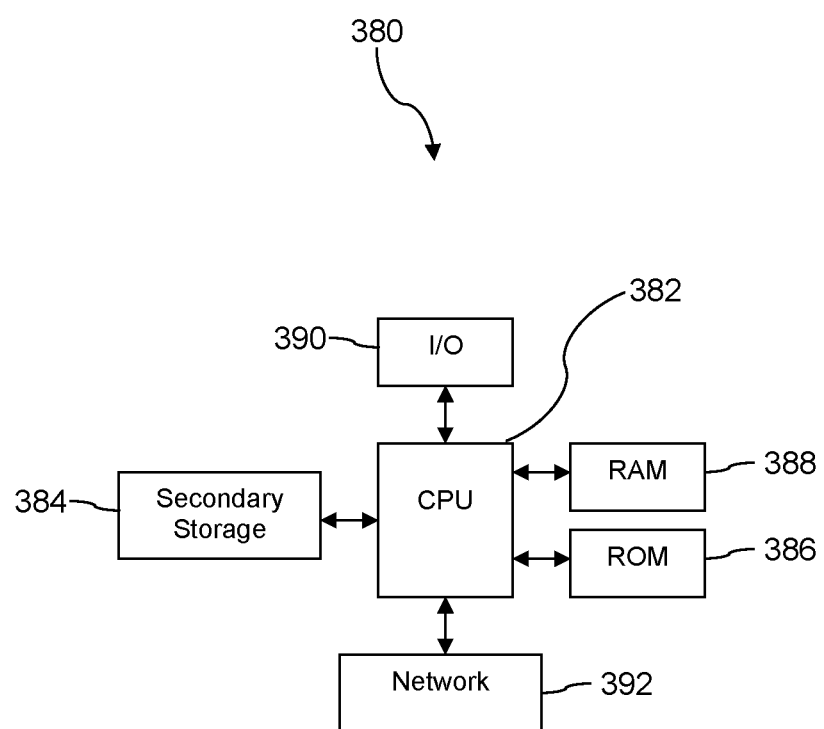
FIG. 8 is a block diagram of a computer system according to an embodiment of the disclosure.

FIG. 8 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), worldwide interoperability for microwave access (WiMAX), near field communications (NFC), radio frequency identity (RFID), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embodied in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of performing an Internet search from within a mobile application, comprising:

executing a mobile application in a normal execution mode on a mobile communication device, where the mobile application incorporates an Internet search client;

in response to receiving an input to the mobile application selecting the Internet search client, executing the mobile application in a trusted security zone execution mode on the mobile communication device, wherein the mobile application executes instructions of the Internet search client in a graphics processing unit (GPU) of the mobile communication device;

while executing the mobile application in the trusted security zone execution mode on the mobile communication device:

creating a genesis block of a block chain by the Internet search client instructions executing in the GPU, where the genesis block comprises information about the mobile communication device and about a search prompt;

creating an event block of the block chain by the Internet search client instructions executing in the GPU, where the event block comprises information about at least one processing event associated with executing an Internet search;

attaching the event block to the block chain by the Internet search client instructions executing in the GPU;

closing the block chain by the Internet search client instructions executing in the GPU; and transmitting the block chain by the mobile communication device to a data store; and reverting by the mobile application to execution of the mobile application in the normal execution mode.

2. The method of claim 1, wherein each event block comprises a hash value of a preceding block of the block chain, a nonce, and a hash calculated over the event block itself.

3. The method of claim 1, wherein the genesis block comprises a location of the mobile communication device.

4. The method of claim 1, wherein the genesis block comprises an identity of the Internet search client.

5. The method of claim 1, wherein the at least one processing event comprises a search result.

6. The method of claim 1, wherein the at least one processing event comprises a search prompt.

7. The method of claim 1, wherein the mobile communication device is one of a mobile phone, a smart phone, a wearable computer, a personal digital assistant (PDA), a headset computer, a laptop computer, a notebook computer, and a tablet computer.

8. The method of claim 1, further comprising:

executing a second mobile application in a normal execution mode on the mobile communication device, where the second mobile application incorporates an event monitoring agent;

in response to receiving an input to the second mobile application, executing the second mobile application in a trusted security zone execution mode on the mobile communication device;

creating a genesis block of a second block chain by the second mobile application executing in the trusted security zone execution mode, where the genesis block of the second block chain comprises information about the mobile communication device and about the second mobile application;

creating an event block of the second block chain by the event monitoring agent executing in the trusted security zone execution mode, where the event block of the second block chain comprises information about at least one processing event associated with executing the second mobile application;

attaching the event block to the second block chain by the event monitoring agent executing in the trusted security zone execution mode;

transmitting the second block chain by the second mobile application to a second data store; and reverting by the second mobile application to execution in the normal execution mode.

9. The method of claim 8, wherein the second mobile application is a media player.

10. The method of claim 8, wherein the event block of the second block chain comprises information about at least one event selected from the list consisting of a play input event, a pause input event, and a skip input event.

11. The method of claim 10, wherein the event block of the second block chain comprises information that identifies an item of content.

12. The method of claim 8, wherein the second mobile application transmits the second block chain while executing in the trusted security zone execution mode.

13. The method of claim 8, wherein the second mobile application transmits the second block chain while executing in the normal execution mode.

14. A mobile communication device, comprising:
a central processing unit (CPU);
a graphics processing unit (GPU);
a non-transitory memory comprising a mobile application incorporating an Internet search client that, when the mobile application is executed by at least one of the CPU and the GPU:
   executes the mobile application in a normal execution mode on the mobile communication device,
   receives an input selecting the Internet search client,
   in response to the input, begins execution of the mobile application in a trusted security zone execution mode, wherein instructions of the Internet search client execute in the GPU,
   during execution of the mobile application in the trusted security zone execution mode:
      creates a genesis block of a block chain via the Internet search client instructions executing in the GPU, where the genesis block comprises information about the mobile communication device and about a search prompt,
      creates an event block of the block chain via the Internet search client instructions executing in the GPU, where the event block comprises information about at least one processing event associated with executing an Internet search,
      attaches the event block to the block chain via the Internet search client instructions executing in the GPU, and
      transmits the block chain to a data store, and
   reverts to execution in the normal execution mode.

15. The mobile communication device of claim 14, wherein the mobile communication device comprises a radio transceiver that is configured to establish a wireless communication link according to at least one of a long term evolution (LTE), a code division multiple access (CDMA), a global system for mobile communications (GSM), or a worldwide interoperability for microwave access (WiMAX) telecommunication protocol.

16. The mobile communication device of claim 14, wherein the event block comprises information about an elapsed time between a search request and a search result.

17. The mobile communication device of claim 16, wherein the event block that comprises information about the elapsed time further comprises information about a wireless bandwidth available to the mobile communication device during the elapsed time.

18. The mobile communication device of claim 14, wherein the genesis block comprises information identifying a phone number of the mobile communication device, identifying a brand of the mobile communication device, and identifying a model of the mobile communication device.

19. The mobile communication device of claim 14, wherein the genesis block comprises information identifying the mobile application.

20. The mobile communication device of claim 14, further comprising closing the block chain by the Internet search client instructions executing in the GPU.

* * * * *